United States Patent
Xie et al.

(10) Patent No.: US 7,186,424 B2
(45) Date of Patent: Mar. 6, 2007

(54) MULTIFUNCTIONAL NUTRIENT SUPPLEMENT AND A PROCESS FOR MAKING

(76) Inventors: Ming Xie, 2100 Wise St., #116, Bridge City, TX (US) 77611; Dingzhong Xie, 135 Yuejing Road Anchun Ltd., Changsha (CN); Yong Feng, 135 Yuejing Road Anchun Ltd., Changsha (CN); Hui Zeng, 135 Yuejing Road Anchun Ltd., Changsha (CN)

( * ) Notice: Subject to any disclaimer, the term of this patent is extended or adjusted under 35 U.S.C. 154(b) by 408 days.

(21) Appl. No.: 10/947,320

(22) Filed: Sep. 23, 2004

(65) Prior Publication Data

US 2005/0158398 A1 Jul. 21, 2005

Related U.S. Application Data

(60) Provisional application No. 60/537,552, filed on Jan. 21, 2004.

(51) Int. Cl.
*A61K 36/16* (2006.01)
*A61K 36/89* (2006.01)
*A61K 35/54* (2006.01)

(52) U.S. Cl. .................. 424/752; 424/750; 424/581

(58) Field of Classification Search ............ 426/648, 426/655; 424/725
See application file for complete search history.

(56) References Cited

U.S. PATENT DOCUMENTS

| 4,554,170 | A | * | 11/1985 | Panzner et al. ............ 426/651 |
| 5,569,458 | A | | 10/1996 | Greenberg |
| 5,891,465 | A | | 4/1999 | Keller et al. |
| 5,976,548 | A | | 11/1999 | Hsia et al. |
| 6,090,414 | A | | 7/2000 | Passwater et al. |
| 6,224,871 | B1 | | 5/2001 | Hastings et al. |
| 6,270,774 | B1 | | 8/2001 | Hsia et al. |

(Continued)

FOREIGN PATENT DOCUMENTS

GB 2043425 10/1980

(Continued)

OTHER PUBLICATIONS

Reventos et al, Application and Possibilities of Supercritical C02 Extraction in Food PRocessing Industry: An Overview, Food Science Technical Int., vol. 8, (2), 2002, pp. 269-284.*

*Primary Examiner*—Christopher R. Tate
*Assistant Examiner*—Deborah A. Davis
(74) *Attorney, Agent, or Firm*—Richard C. Litman

(57) ABSTRACT

The present invention is a multifunctional nutrient supplement and a process for creating the supplement. The supplement comprises a mixture of lecithin, *ginkgo biloba* and wheat germ oil. The supplement is made with a five step formation process. The first step of the process uses $CO_2$ supercritical extraction to remove cholesterol, glyceride and fatty acids from an egg yolk. Wheat germ oil is then obtained from dried wheat germ using $CO_2$ supercritical extraction. *Gingko biloba* is then removed from *ginkgo* leaves using $CO_2$ supercritical extraction. The egg yolk/lecithin from the first extraction is then combined with the wheat germ oil from the second extraction. Ethanol is then added to the mixture of lecithin and wheat germ oil and low temperature vacuum distilled to create a lecithin and wheat germ oil mixture. The *ginkgo biloba* extract is then added to the lecithin/wheat germ oil mixture to create the nutrient supplement.

19 Claims, 3 Drawing Sheets

U.S. PATENT DOCUMENTS

| | | |
|---|---|---|
| 6,291,533 B1 | 9/2001 | Fleischner |
| 6,503,529 B1 | 1/2003 | Fleischner |
| 2001/0036468 A1 | 11/2001 | Han et al. |
| 2002/0048551 A1 | 4/2002 | Keller et al. |
| 2003/0008048 A1 | 1/2003 | Winston et al. |

FOREIGN PATENT DOCUMENTS

| | | |
|---|---|---|
| GB | 2324457 | 10/1998 |

* cited by examiner

MULTIFUNCTIONAL NUTRIENT SUPPLEMENT AND A PROCESS FOR MAKING

CROSS-REFERENCE TO RELATED APPLICATION

This application claims the benefit of U.S. Provisional Patent Application Ser. No. 60/537,552, filed Jan. 21, 2004.

BACKGROUND OF THE INVENTION

1. Field of the Invention

The present invention relates to processes for making nutritional supplements, and more particularly to a process for making a multifunctional nutrient supplement containing a mixture of lecithin, *ginkgo biloba* and wheat germ oil, and that aids in the prevention of cardiovascular, liver and lung diseases, improves memory and increases energy levels.

2. Description of the Related Art

The individual nutrient value of lecithin, *ginkgo biloba* and wheat germ oil has been widely recognized. The predominant type of compounds in lecithin is phospholipids. Muscles, vital organs like the liver, lungs and the reproductive track contain a high concentration of phospholipids. On a dry weight basis, the brain contains 25 percent phospholipids. Phospholipids are also a major type of building blocks of cellular membranes, which are very important for transport nutrients and wasters.

*Ginkgo biloba* has been shown to have antioxidant and anti-inflammatory properties. The principal constituents of *ginkgo biloba* extract include flavanoids and terpenoids. The flavanoids protect the cell by reducing cell membrane lipid peroxidation. Terpenoids contribute to neuroprotective effects.

Wheat germ is an excellent source of Vitamin E, linoleic acid and linolenic acid. Linoleic acid has demonstrated the ability to inhibit cancer growth and to inhibit obesity. Alpha-linolenic acid is used as a source of energy by the human body. It is also used to treat heart disease and hypertension. Gamma-linolenic acid has been shown to be useful in treating diabetes, osteoporosis, menopausal systems and PMS.

The following patent documents disclose nutritional supplements, and their formation processes, providing some of the above-mentioned nutrients.

United Kingdom Patent Application No. GB 2 324 457 published on Oct. 28, 1998 discloses a nutritional supplement containing a number of essential oils. The supplement comprises a droplet of oils coated in an emulsifying agent such as lecithin.

United Kingdom Patent Application No. GB 2 043 425 published on Oct. 8, 1980 discloses a daily nourishing supplement and a process for the production of the same. The nourishing supplement is a capsule containing freeze-dried hot water extract of *Chlorella* algae, at least two extracts of garlic, ume, sinseng and aloe, lecithin, at least two vegetable oils and Vitamin E.

U.S. Pat. No. 6,503,529 issued on January 7, 2003 and U.S. Pat. No. 6,291,533 issued on Sep. 18, 2001 to Fleischner, A. M. discloses dietary supplements that are responsive to specific blood types. Certain supplements contain lecithin and *ginkgo biloba* leaf extract.

U.S. Pat. No. 6,270,774 issued on Aug. 7, 2001 to Hsia et al. discloses a nutritional supplement that is used to increase the levels of high density lipoprotein and calcium ions, and decrease levels of free radicals and glucose in human blood plasma. The present invention teaches novel nutritional supplements that comprise a novel combination of specific antioxidants, barley grass extract, multiple vitamins and minerals, and *ginkgo biloba* extract. The present patent further discloses a method of preparing the supplement.

U.S. Pat. No. 6,224,871 issued on May 1, 2001 to Hastings et al. discloses a dietary supplement for nutritionally promoting healthy joint function. The major ingredient of the supplement is a protein derived from the enzymatic hydrolysis of collagen. The supplement also includes lesser proportions of other ingredients including lecithin and *ginkgo biloba*.

U.S. Pat. No. 6,090,414 issued on Jul. 18, 2000 to Passwater et al. discloses a method and composition to reduce cancer incidence. The cancer fighting composition provides wheat germ oil and lecithin.

U.S. Pat. No. 5,976,548 issued on Nov. 2, 1999 to Hsia et al. discloses a nutritional supplement composition. The supplement is designed to increase the levels of high density lipoprotein and calcium ions while decreasing levels of free radicals and glucose in human blood plasma. The nutritional supplement comprises a combination of naturally occurring substances such as vitamins and minerals, antioxidants, barley grass extract and *ginkgo biloba* extract.

U.S. Pat. No. 5,891,465 issued on Apr. 6, 1999 and United States Patent Application Number 2002/0048551 published on Apr. 25, 2002 to Keller et al. disclose a delivery of biologically active material in a liposomal formulation for administration into the mouth. The compositions of biologically active material are based on nutritional supplements that are encapsulated in lipid vesicles for administration as an aerosol or liquid droplet spray. The compositions include a quantity of lecithin.

U.S. Pat. No. 5,569,458 issued on Oct. 29, 1996 to Greenberg, M. discloses a nutritional formula. The nutritional formula is a vitamin and mineral formulation that provides for improved absorption of its nutrients by the addition of digestive enzymes to the formula. The formula also includes goldenseal to prevent the enzymes from eating up the other nutrients in the formula. The formula contains seventy different nutrients including *ginkgo biloba*.

United States Patent Application Number 2003/0008048 published on Jan. 9, 2003 for Winston et al. discloses methods and compositions for helping the body resist the effects of the aging process. The composition is a two part composition comprising a lipid-soluble portion in a soft gel cap and a water soluble portion in a hard shell capsule. The composition provides a plurality of nutrients including *ginkgo biloba* extract.

U.S. Patent Application No. 2001/0036468 published on Nov. 1, 2001 to Han et al. discloses a soft chewable multivitamin tablet comprising separated active ingredients. The multivitamin provides a plurality of nutrients including *ginkgo biloba* and lecithin.

None of the above inventions and patents, taken either singly or in combination, is seen to describe the instant invention as claimed. Thus a multifunctional nutrient supplement solving the aforementioned problems is desired.

SUMMARY OF THE INVENTION

The present invention is a multifunctional nutrient supplement and a process for creating the supplement. The multifunctional nutrient supplement generally comprises a mixture of lecithin, *ginkgo biloba* and wheat germ oil. The multifunctional nutrient supplement is made with a five step formation process. The first step of the process uses $CO_2$ supercritical extraction to remove cholesterol, glyceride and fatty acids from an egg yolk to yield a quantity of lecithin. A quantity of wheat germ oil is then obtained from a raw material of dried wheat germ using $CO_2$ supercritical extraction. A quantity of *gingko biloba* is then removed from *ginkgo* leaves using $CO_2$ supercritical extraction. The egg yolk/lecithin from the first extraction is then combined with the wheat germ oil from the second extraction. Ethanol is then added to the mixture of lecithin and wheat germ oil and low temperature vacuum distilled to create a lecithin and wheat germ oil mixture. The *ginkgo biloba* extract is then added to the lecithin/wheat germ oil mixture to create the multifunctional nutrient supplement.

Accordingly, it is a principal object of the invention to provide a process for making a multifunctional nutrient supplement that keeps each individual active ingredient intact when extracted from the raw materials.

It is another object of the invention to provide a multifunctional nutrient supplement that aids in the prevention of cardiovascular, liver and lung diseases.

It is a further object of the invention to provide a multifunctional nutrient supplement that lowers low-density lipid levels.

Still another object of the invention is to provide a multifunctional nutrient supplement that reduces the effects of hypertension.

Still another object of the invention is to provide a multifunctional nutrient supplement that improves memory and energy levels.

Still a further object of the invention is to provide a multifunctional nutrient supplement that relieves the effects of premenstrual syndrome (PMS).

Still a further object of the invention is to provide a multifunctional nutrient supplement that gradually eliminates heavy vaginal discharge.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
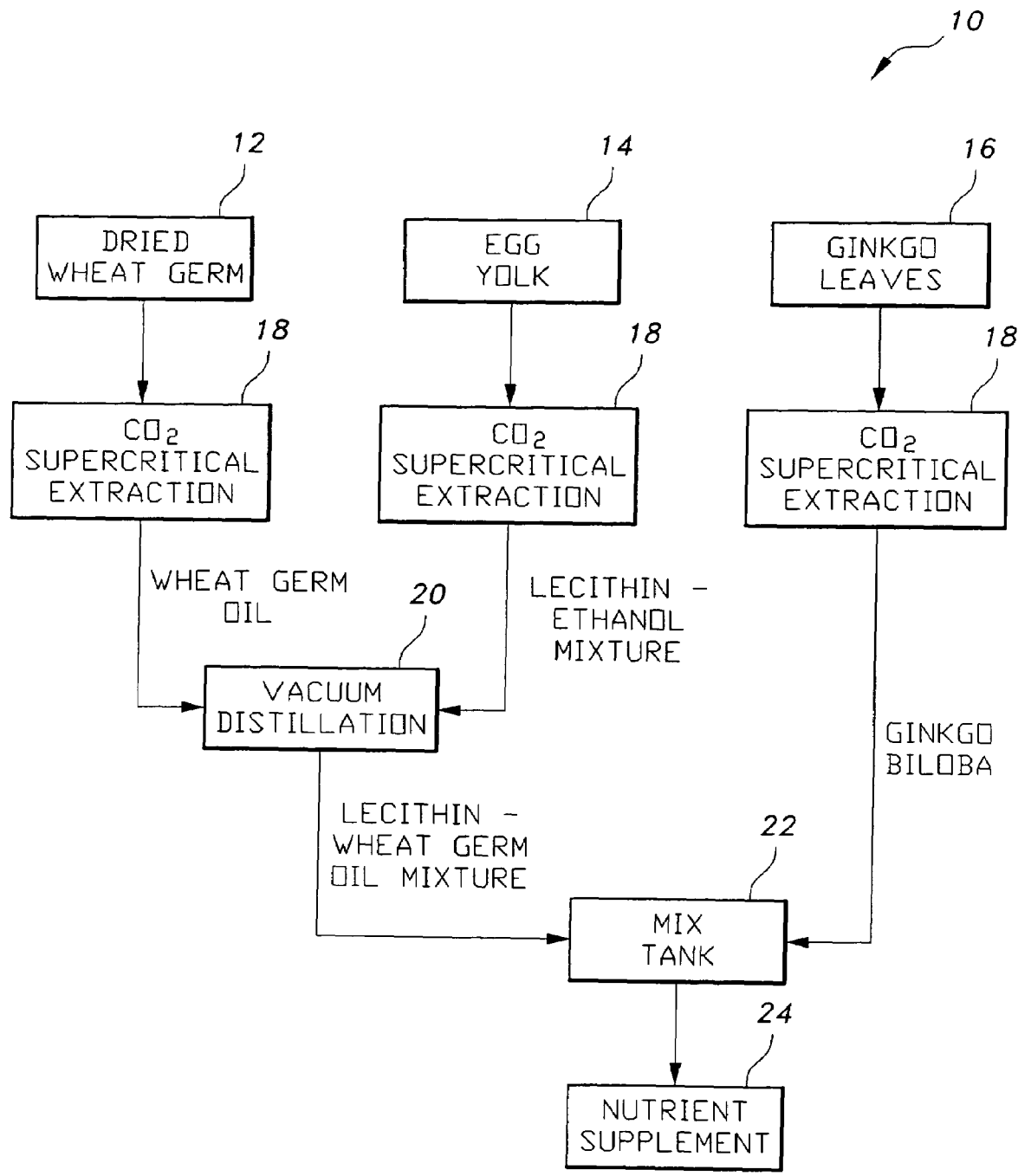
FIG. 1 is a process diagram for a process of making a multifunctional nutrient supplement according to the present invention.

The present invention provides a multifunctional nutrient supplement and a method for making the supplement. The multifunctional nutrient supplement provides a source of lecithin, *ginkgo biloba* and wheat germ oil. The nutrient supplement is made from a five step formation process. The nutrient supplement formation process 10 is shown in FIG. 1. The first step of the process 10 is to obtain the raw materials that provide the nutrients for the supplement. The raw materials comprise dried wheat germ 12, egg yolk 14 and *ginkgo* leaves 16. Ideally the raw materials should be obtained within a specified time period for best results. For instance, the eggs should be no worse than one-year fresh; the *gingko* leaves should be harvested in the fall season after the month of October from a *ginkgo* tree being between the ages of three to five years; the wheat germ should be no worse than one-year fresh.

The next step is to use $CO_2$ supercritical extraction 18 to derive extracts for each raw material component. $CO_2$ supercritical extraction removes wheat germ oil from the dried wheat germ 12. $CO_2$ supercritical extraction 18 is also used to remove cholesterol, glyceride and other fatty acids from the egg yolk 14. Egg yolk 14 is used as the source for lecithin. Egg yolk 14 is a much better lecithin source than the commonly used soybean if the cholesterol, glyceride and fatty acids are removed from the egg yolk 14. Supercritical extraction is again used to extract *ginkgo biloba* from the *ginkgo* leaves 16.

Figure 2:
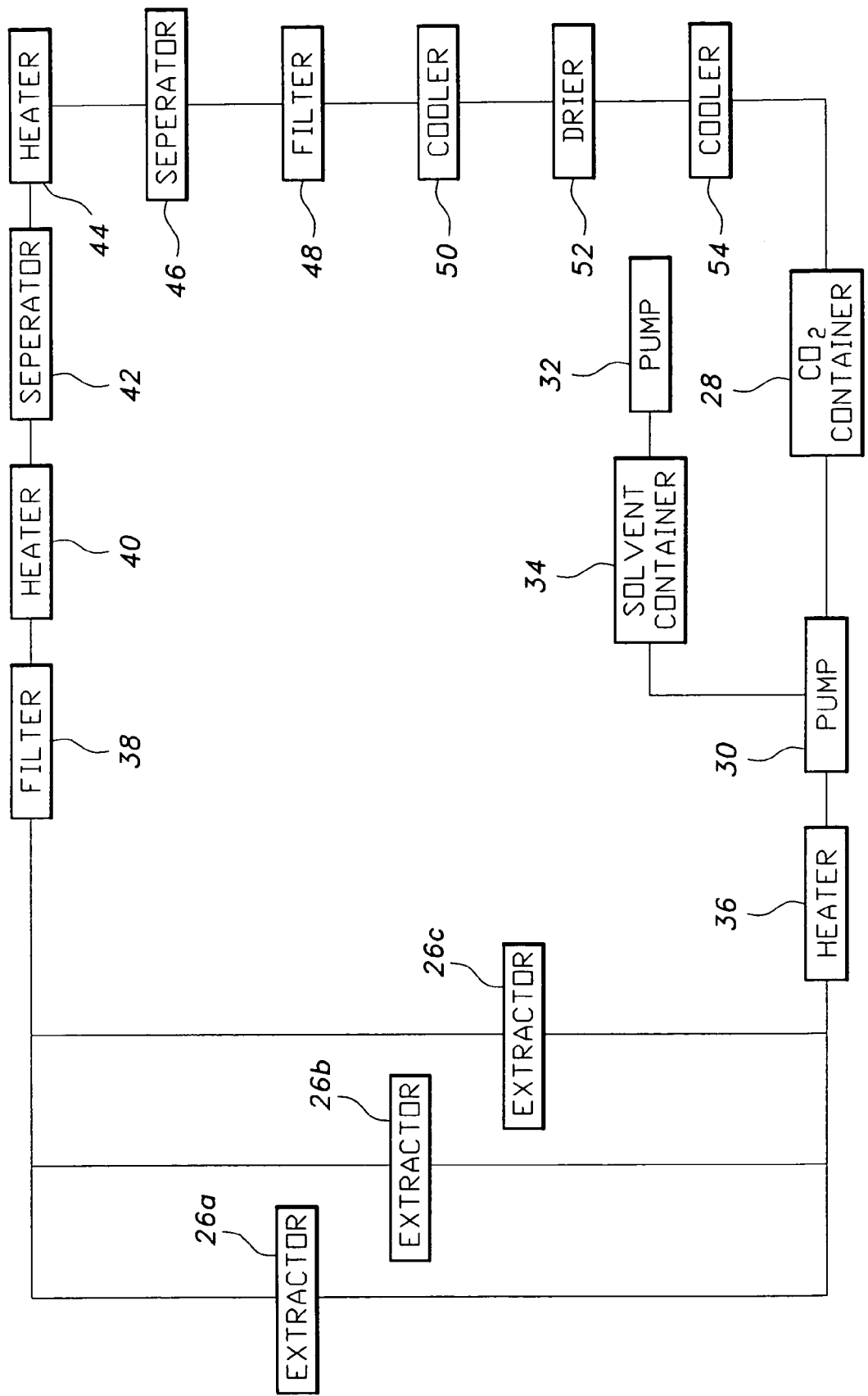
FIG. 2 is a process diagram for a $CO_2$ supercritical extraction process.

The $CO_2$ supercritical extraction 18 process is shown in FIG. 2. The $CO_2$ supercritical extraction 18 is the same process for all three raw materials so only a general discussion of the process is necessary. Preheated dried raw material is introduced into the three extractors 26a, 26b and 26c (One raw material is extracted at a time so all three extractors 26a, 26b and 26c contain the same raw material). Each of the three raw materials are extracted at specific pressures and temperatures in the extractors 26a, 26b and 26c.

A solvent, held inside of a solvent container 34, is introduced into the extractors 26a, 26b and 26c by a solvent pump 32. Liquid $CO_2$ held in $CO_2$ container 28 is introduced into the extractors 26a, 26b and 26c by a $CO_2$ pump 30. The liquid $CO_2$ is used for the extraction of wheat germ oil but it is especially used for the extraction of *Ginko Biloba* by dissolving the ingredients in the leaves. The liquid $CO_2$ and the solvent are passed through a liquid $CO_2$ heater 36 and are then introduced through the bottom of the extractors 26a, 26b and 26c. The solvent is used to help extract polar components from the raw materials. If polarity is not a problem during extraction, then a solvent is not used. According to certain preferred embodiments of the present invention the solvent is used to extract the polar components from the *ginkgo* leaves. According to certain preferred embodiments of the present invention the solvent used is ethanol.

The mixture of liquid $CO_2$ and the extracts from the raw materials then pass through a first filter 38, an extract heater 40 and then a primary separator 42. Generally, to extract and separate the raw materials from the $CO_2$ phase, the pressure and temperature in the primary separator is reduced to 7 M Pa from the initial pressure and temperature in the the extractors 26a, 26b and 26c. The primary extracts are obtained from the bottom of the primary separator 42. The remaining un-separated $CO_2$ and raw material extracts are introduced into a second extract heater 44 and then a secondary separator 46. Generally the secondary separator 46 is used only when the ingredient concentration of the sample taken from the primary separator 42 is not in a correct range desired from raw material extract. Thus the raw material passes into the secondary separator 46, having a pressure of 7 M Pa, whereby the remaining raw material extracts are separated from the $CO_2$ phase. The secondary extracts are obtained from the bottom of the secondary separator 46. The gas $CO_2$ exits the top of the secondary separator 46 and passes through a gas filter 48, a gas cooler 50 and a gas drier 52. The gas drier 52 removes the moisture from the $CO_2$ gas. The dried $CO_2$ gas is cooled further by a second gas cooler 54 to change the phase of the $CO_2$ from gas to liquid. The liquid $CO_2$ is then delivered to the $CO_2$ container 28 where it is recycled back into the supercritical extraction process 18.

Once the wheat germ oil, the lecithin and the egg yolk are extracted from the raw materials they must be combined. The extracted egg yolk, containing lecithin, is combined with the extracted wheat germ oil. Ethanol is added to the mixture and it is placed into a vacuum distiller 20. The wheat germ oil-egg yolk-ethanol mixture is low temperature vacuum distilled to obtain a mixture of lecithin and wheat germ oil.

Figure 3:
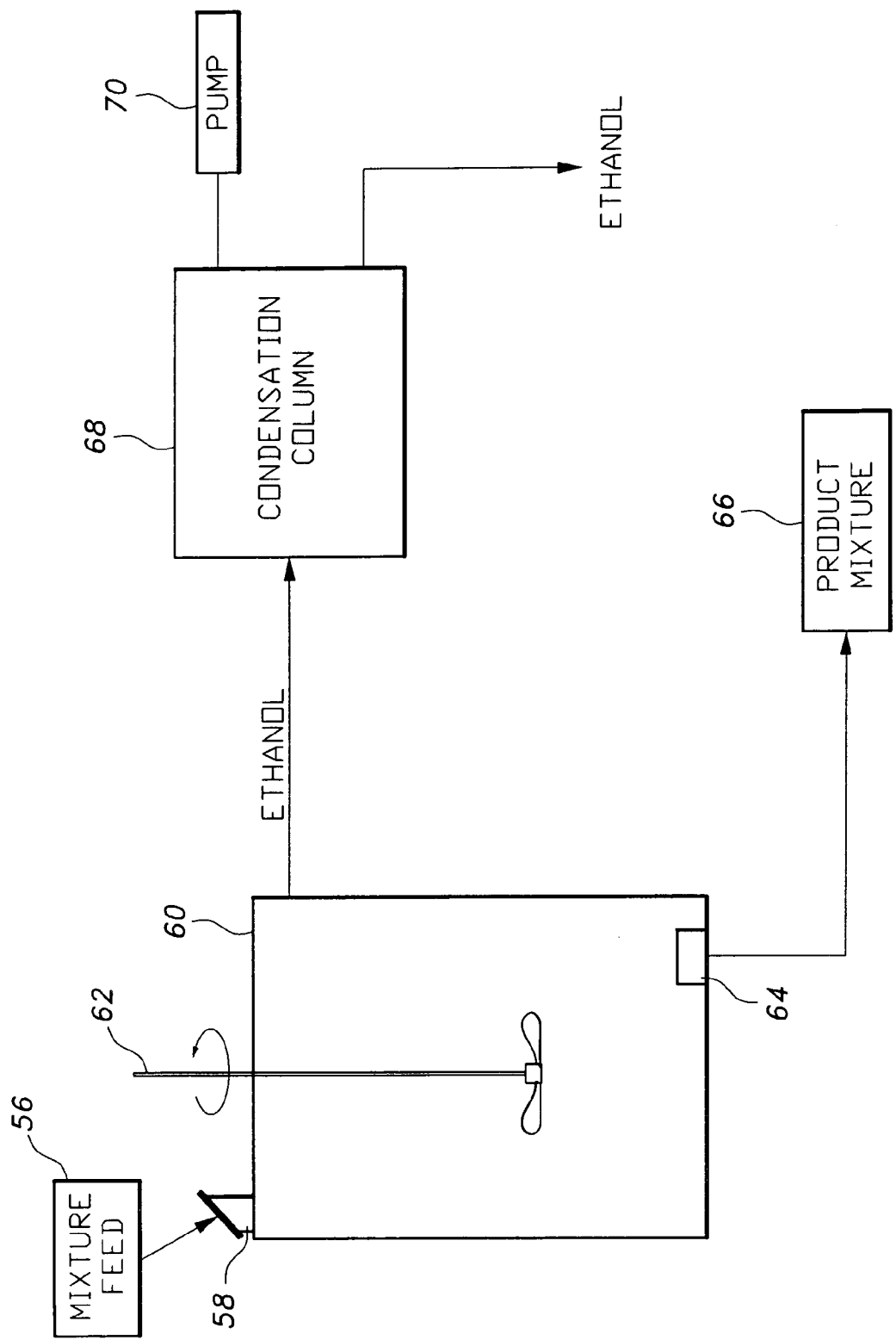
FIG. 3 is a process diagram for a vacuum distillation process.

FIG. 3 depicts the vacuum distillation process. The wheat germ oil-egg yolk-ethanol mixture 56 is fed into a distillation container 60 through a feed inlet 58. The mixture 56 is stirred in the distillation container 60 by a stirrer 62. Hot steam is continuously introduced to the outer surface of the distillation container 60, to heat up the mixture 56 inside of the container 60. Heating up the mixture 56 causes the ethanol to evaporate. At the same time heat is being consumed so that the hot steam turns into condensation water. The product mixture 66, which is a mixture of wheat germ oil and extracted egg yolk, is removed from the distillation container 60 through a product outlet 64. The evaporated ethanol is transferred to a condensation column 68. Cold water is continuously introduced to the outer surface of the condensation column 68 to cool down the ethanol. Once the gaseous ethanol is cooled it changes into liquid ethanol, which can be reused as a solvent in the $CO_2$ supercritical extraction 18 process. As the ethanol is being cooled heat is gained so that the cold water that was used to cool the condensation column becomes warm water. A vacuum pump 70 is used to power the distillation process.

Once the distilled wheat germ oil-egg yolk mixture is obtained it is placed into a mix tank 22, see FIG. 1. The extracted *ginkgo biloba* is then added into the mix tank 22 and mixed with the wheat germ oil and egg yolk to form the nutrient supplement mixture 24.

The following specific example is indicative of the preferred nutrient supplement and method of preparing the supplement according to certain preferred embodiments of the present invention.

EXAMPLE 1

100 kilograms of dried, preheated wheat germ is introduced into the extractors 26a, 26b and 26c at a pressure of 26 M Pa, 45° C. The extraction proceeds for 3 hours. Once the primary mixture of extracted material reaches the primary separator 42 the pressure is reduced to 7.0 M Pa. After extraction, approximately 2.0–2.2 kilograms of yellowish wheat germ oil is obtained having a concentration of gamma-linolenic acid being between 5.5 and 8 wt % and a concentration of linoleic acid being between 55 to 58 wt %.

The egg yolks are dried and ground to a fine powder. 100 kilograms of egg yolk powder is introduced into the extractors 26a, 26b and 26c at a pressure of 30 M Pa, at 40° C. The extraction proceeds for approximately 4–5 hours. The cholesterol, glyceride and fatty acid components dissolve in the liquid $CO_2$ and are removed from the egg yolk. The egg yolk containing lecithin mixture is obtained from the bottom of the extractors 26a, 26b and 26c. In this mixture the total composition of cholesterols, glycerides and fatty acids is less than 0.1 wt %. Phosphatidyl choline is no less than 18 wt %. Once the lecithin containing egg yolk mixture reaches the primary separator 42 the pressure is reduced to 7.0 M pa.

The lecithin containing egg yolk mixture is then placed in an 800 L container. 240 kilograms of ethanol is added into the container and mixed for two hours. The lecithin dissolves in the ethanol. Solid impurities are removed from the mixture by filtration.

The filtrated lecithin is then mixed with the extracted wheat germ oil in the distillation container 60. The ethanol is distilled out of the container 60 at a temperature of 40° C. and a vacuum pressure of 0.05 M Pa. The distilled ethanol is delivered to the condensation column 68. The mixture of lecithin and wheat germ oil is released from the bottom of the distillation container 60. In the resultant mixture the phosphatidyl choline should be more than 22 wt % and the ethanol should be less than 0.2 wt %.

100 kilograms of shredded *ginkgo* leaves are introduced into the extractors 26a, 26b and 26c at a pressure of 30 M Pa, at a temperature of 60° C. The extraction proceeds for 4 hours. The ginkgolic acid dissolves in the liquid $CO_2$ and is removed. This mixture removed from the bottom of the extractors 26a, 26b and 26c and is then fed back into the extractors 26a, 26b and 26c to proceed with the extraction process one more time at 28 M Pa and 55° C. Ethanol is pumped into the extractor through the solvent pump 32 to improve the extraction of the more polar components of the *ginkgo* mixture whereby undesired ingredients, ginkgolic acid, are gradually removed. This extraction proceeds for 2 hours. By reducing the pressure of the primary separator to 7.0 M Pa, the *ginkgo* extracts are separated from the ethanol. The composition of the *ginkgo* flavone and *ginkgo* terpine in the *ginkgo* extract is 26 wt % and 6 wt % respectively. After the first extraction step, the ginkgolic acid is less than 5 ppm; after the second extraction step, the ginkgolic acid in the final product is less than 1 ppm.

The *ginkgo* extracts mixture was then mixed with the lecithin and wheat germ oil mixture and mixed well to produce the nutrient supplement mixture.

Table 1, below, lists the major components of the resulting nutrient supplement according to certain preferred embodiments of the present invention. Table 1 also lists the possible weight percentage range of each component in the final product.

TABLE 1

| Component | wt % |
| --- | --- |
| lecithin | 20–35 |
| phosphatidyl choline | 12–14 |
| ginkgo flavones | 2.0–2.2 |
| ginkgo terpines | 0.6–0.7 |
| vitamin E | 0.5–0.7 |
| linoleic acid | 18–33 |
| linolenic acid | 1.8–3.6 |

The anti-oxidant properties of vitamin E (in wheat germ oil) and the flavanoids (in *ginkgo biloba*) play a role to keep the active ingredients of nutrient supplement intact.

It is to be understood that the present invention is not limited to the embodiments described above, but encompasses any and all embodiments within the scope of the following claims.

We claim:

1. A multifunctional nutrient supplement made from a process comprising the steps of:
    obtaining a quantity of egg yolk, *ginkgo* leaves and dried wheat germ;
    using $CO_2$ supercritical extraction to remove cholesterol, glyceride and fatty acids from the egg yolk to produce an egg yolk extract;

using CO$_2$ supercritical extraction to extract wheat germ oil from the dried wheat germ;

using CO$_2$ supercritical extraction to extract *ginkgo* components from the *gingko* leaves;

combining the egg yolk extract and the wheat germ oil in a distillation container;

adding ethanol to the distillation container and low-temperature vacuum distilling the egg yolk extract and wheat germ oil to produce a distilled mixture; and adding the *ginkgo biloba* extract to the distilled mixture and mixing them together to produce a nutrient supplement comprising lecithin, *ginkgo* components and wheat germ oil.

2. The method according to claim 1, wherein the quantity of egg yolk is obtained from eggs that are no worse than one year fresh.

3. The method according to claim 2, wherein the egg yolks are dried and ground into a fine powder.

4. The method according to claim 1, wherein the quantity of *ginkgo* leaves is obtained from *ginkgo* leaves harvested in the fall season after October from a *ginkgo* tree being between the ages of three to five years.

5. The method according to claim 1, wherein the quantity of dried wheat germ is obtained from wheat germ that is no worse than one year fresh.

6. The method according to claim 1, wherein the egg yolk extraction is conducted under extraction conditions occurring at a pressure of 30 M Pa and 40° C.

7. The method according to claim 6, wherein the egg yolk extract comprises cholesterol, glyceride and fatty acids in a total weight percent of less than 0.1%.

8. The method according to claim 1, wherein the wheat germ oil extraction is conducted under extraction conditions occurring at a pressure of 26 M Pa and 45° C.

9. The method according to claim 8, wherein the wheat germ oil has a concentration of gamma-linolenic acid being between 5.5 and 8 wt %.

10. The method according to claim 8, wherein the wheat germ oil has a concentration of linoleic acid being between 55 to 58 wt %.

11. The method according to claim 1, wherein the *ginkgo biloba* extraction is conducted under a first extraction having conditions occurring at a pressure of 30 M Pa and 60° C.

12. The method according to claim 11, wherein the extract has a presence of ginkgolic acid of less than 5 ppm.

13. The method according to claim 11, further comprising a second extraction conducted under conditions occurring at a pressure of 28 M Pa and 55° C.

14. The method according to claim 13, wherein the extract has a presence of ginkgolic acid of less than 1 ppm.

15. The method according to claim 1, wherein a solvent is pumped into the CO$_2$ supercritical extractor during the extraction of *ginkgo* components from the *gingko* leaves to help remove ginkgolic acid.

16. The method according to claim 15, wherein the solvent is ethanol.

17. The method according to claim 1, wherein the *ginkgo* extract has a composition of 26 wt % of *ginkgo* flavone.

18. The method according to claim 1, wherein the *ginkgo* extract has a composition of 6 wt % of *ginkgo* terpine.

19. A multifunctional nutrient supplement according to claim 1, wherein the weight percentage of each active ingredient in the nutrient supplement as determined under high performance liquid chromatography are in the following approximate ranges:

| Component | wt % |
| --- | --- |
| lecithin | 20–35 |
| phosphatidyl choline | 12–14 |
| ginkgo flavones | 2.0–2.2 |
| ginkgo terpines | 0.6–0.7 |
| Vitamin E | 0.5–0.7 |
| linoleic acid | 18–33 |
| linolenic acid | 1.8–3.6. |

* * * * *